United States Patent Office.

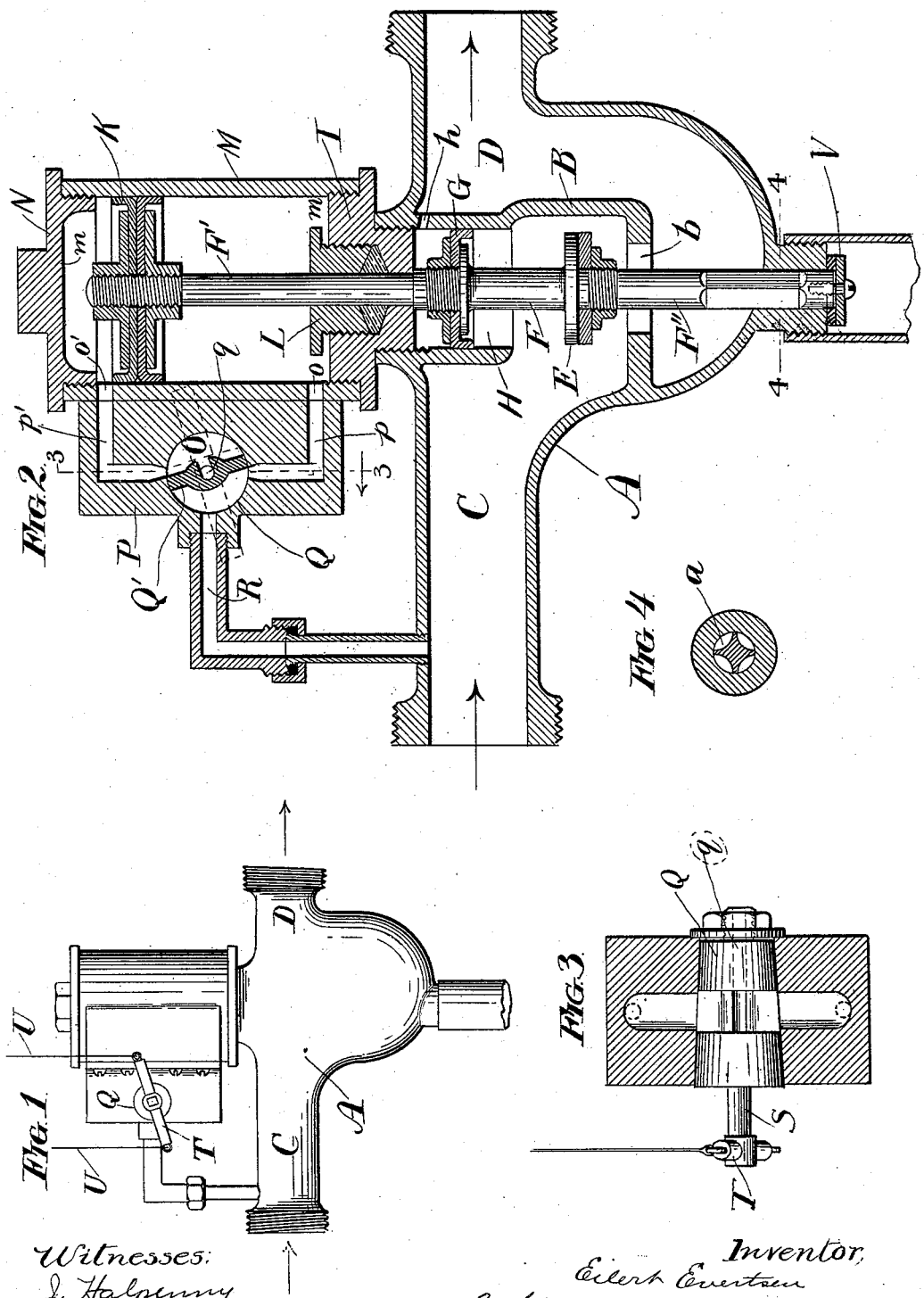

EILERT EVERTSEN, OF CHICAGO, ILLINOIS, ASSIGNOR OF THREE-FOURTHS TO HAROLD T. THAMS, HUGO FREELS, AND BENJAMIN DALSING, OF SAME PLACE.

VALVE.

SPECIFICATION forming part of Letters Patent No. 589,124, dated August 31, 1897.

Application filed March 12, 1896. Serial No. 582,882. (No model.)

*To all whom it may concern:*

Be it known that I, EILERT EVERTSEN, a citizen of the United States, residing at Chicago, in the county of Cook and State of Illinois, have invented certain new and useful Improvements in Valves, of which the following is a specification, reference being had to the accompanying drawings, which are made a part hereof, and in which—

Figure 1 is a side elevation of a valve embodying the invention. Fig. 2 is a vertical section thereof on a somewhat larger scale. Fig. 3 is a section of a portion thereof on the line 3 3, Fig. 2, looking in the direction of the arrow. Fig. 4 is a section of a portion thereof on the line 4 4, Fig. 2.

In the drawings I have illustrated all of the several features of my invention as being embodied in a combined check and waste valve—that is to say, a device having a valve that is adapted to control the flow of water from the main to the service-pipe of a building, and a second valve adapted to control a waste-opening through which the service-pipe is drained, the two valves being so connected that they operate reciprocally, one being always unseated when the other is seated. I desire to have it understood, however, that some features of my invention may be embodied in a check-valve with which a waste-valve is not combined.

Valves of this class are usually buried underground below the frost-line, and as customarily constructed the pressure of the water against the valve proper, the friction of the parts, corrosion, and other causes have made it necessary to use heavy connections extending to a point within reach above ground for operating them.

The principal object of the present invention is to provide a valve of such construction that these heavy connections may be dispensed with and its operation effected through very much lighter connections.

To this end I so construct the valve that whether the check-valve is closed or not the pressure of the water upon it is balanced, and I associate with the valve a hydraulic motor so connected with the main as to be operated by the pressure of water taken therefrom, the connection between the motor and main being under the control of an auxiliary valve that is so small and that is so constructed that the combined effects of friction and the pressure of the water against it do not make it necessary to apply to it any considerable force in order to change its position and thereby change the condition which governs the motor. By properly constructing this motor-valve it may be operated by a very slight force, and this force may be transmitted to it through a wire or wires (mechanically or electrically) or through any other light and simple connection, and this connection may be carried to any desired height above ground. This is important when it is considered that in apartment-buildings a separate check and waste valve is frequently used for each apartment, and it would not be practicable to have the heavy key, rod, or other heavy device that is necessary for operating these valves as customarily constructed extend from the valve to the upper apartments of the building. Hence with valves of the old construction in order to operate them a trip to the basement is necessary, but where the valve is constructed in accordance with my invention this is not necessary, for the reason that the connection for operating the motor-valve may at a slight cost be carried to any desired point, and by properly constructing the hydraulic motor sufficient power for operating the check-valve or the check and waste valves may be taken from the main.

The invention consists in the features of novelty that are particularly pointed out in the claims hereinafter.

A represents the casing, the interior of which is divided by a web B into two chambers or passages C and D, with the former of which the street-main communicates and with the latter of which communicates the service-pipe for conducting the water to the building. The web B is provided with a port *b*, through which the chambers or passages C and D communicate, and this port is under the control of a check-valve E, secured to a stem F, which stem also carries a piston G, fitting in the cylinder H. Upon one side of the piston G the cylinder H is in open communication with the chamber C, and upon the other side it is in open communication with the chamber D, through an opening $h$. The outer end of the cylinder H is closed by a screw-plug I, through which passes an extension F' of the valve-stem, which extension serves also as the rod of a piston K, the joint around it being packed by a stuffing-box L.

M is the cylinder, in which the piston fits, and N is a screw-plug forming the cylinder-head. The cylinder is provided near its opposite ends with ports $o$ $o'$, with which communicate passages $p$ $p'$, leading from a chamber O, formed in a casting P. In this chamber is arranged a plug-valve Q, the opposite sides of which are cut away, so that a portion of the valve which is opposite the passages $p$ $p'$ is reduced to a wing Q', which extends diametrically across the chamber from side to side. The plug is provided with a leak-opening $q$, which places the chamber upon one side of the wing Q' in communication with the atmosphere. The chamber O is also in communication with a water-main through a passage R.

The object of the valve Q is to control the communication between the water-main and the cylinder and between the cylinder and the leak-opening. With the parts as shown in the drawings the water-main is in communication with the end $m$ of the cylinder, and the opposite end $m'$ of the cylinder is in communication with the leak-opening, so that the piston K is held in such position that the check-valve E is unseated and there is a direct communication between the water-main and the service-pipe. When it is desired to cut off the supply of water to the service-pipe it is simply necessary to change the position of the valve Q, so that it places the end $m$ of the cylinder in communication with the leak-opening and the end $m'$ in communication with the water-main. Water under pressure will then enter the end $m'$ of the cylinder and force the piston downward until the valve E is closed, the water in the end $m$ of the cylinder being expelled through the port $o$, passage $p$, chamber O, and leak-opening $q$.

By reason of the fact that opposite ends of the cylinder H are in communication with the water-main and service-pipe, respectively, whether the valve be seated or unseated the pressure upon it will be balanced, so that in moving it the overcoming of the weight and friction of the parts is the only work that the motor has to do.

The valve Q is provided with an extended stem S, with which may be associated any desired mechanism for operating it. As shown in the drawings, I have shown for this purpose a cross-arm T, projecting in opposite directions from the stem, and to the opposite ends of this cross-arm are attached wires or cords U, that may be carried to the point from which it is desired to operate the valve. By reason of the peculiar construction of the valve Q the pressure of the water against it has no tendency to turn it, and its frictional contact with its casing is so slight that it does not require very much force to move it from one position to another, and by using a valve of this character I am enabled to use light connections for operating it, and by making the motor-piston of the necessary size I am enabled to exert upon the check-valve sufficient force for operating it and to derive this force from the pressure of the water in the main.

A waste-valve may or may not be used with the check-valve; but I prefer to use one and to connect it with the check-valve, so that they will be operated reciprocally and by one and the same motor. To this end I provide the stem of the check-valve with an extension F'', which passes through a waste-opening $a$ and carries upon the outside of the casing a waste-valve V, that portion of the stem which passes through the waste-opening being of non-circular shape, as shown more clearly in Fig. 4, so as to permit water to pass it when the valve V is unseated.

Having thus described my invention, the following is what I claim as new therein and desire to secure by Letters Patent:

1. In a check-valve, the combination of a casing having a web dividing its interior into two chambers, C and D, adapted to communicate with the main and service-pipe, respectively, said web having a port through which the chambers communicate, a valve E seating in the direction of the pressure from the main for controlling said port, a stem F by which the valve is carried, a piston G secured to the stem, the valve and piston being of equal area and having their opposed faces exposed to the pressure in the chamber C, a cylinder H in which the piston fits, the chamber C and cylinder being in direct communication with each other on but one side of the piston and the chamber D and cylinder being in direct communication on the opposite side of the piston, and a motor for operating the valve, said motor having a piston connected with the valve-stem, a cylinder in which the piston works, passages communicating with opposite ends of the cylinder and with the main, a valve for controlling said passages, and means for operating said valve, substantially as set forth.

2. In a check-valve, the combination of a casing having a web dividing its interior into two chambers C and D, adapted to communicate with the main and service-pipe, respectively, said web having a port through which the chambers communicate, and said casing having a waste-opening located opposite said port and communicating with the chamber D on the service-pipe side of the web, a valve E seating in the direction of the pressure from the main for controlling said port, a valve for controlling the waste-opening, a stem by which the valves are carried, a piston G secured to the stem, the valve E and piston being of equal area and having their opposed faces exposed to the pressure in the chamber C, a cylinder H in which the piston fits, a port $h$ connecting the chamber D with the cylinder H upon the side of the piston G which is remote from the valve E, whereby the valve is at all times balanced, and means for operating the valves, substantially as set forth.

EILERT EVERTSEN.

Witnesses:
GEO. S. WEBB,
L. M. HOPKINS.